United States Patent [19]

True

[11] Patent Number: 4,679,070
[45] Date of Patent: Jul. 7, 1987

[54] METHOD AND APPARATUS FOR ENHANCING MAGENTA MODULATION OF A LIGHT VALVE PROJECTOR

[75] Inventor: Thomas T. True, Camillus, N.Y.

[73] Assignee: General Electric Company, Princeton, N.J.

[21] Appl. No.: 816,510

[22] Filed: Jan. 6, 1986

[51] Int. Cl.[4] .............................................. H04N 9/31
[52] U.S. Cl. ....................................... 358/62; 358/60
[58] Field of Search ................................... 358/60, 62

[56] References Cited

U.S. PATENT DOCUMENTS 3,437,746  4/1969  Good et al. ............................ 358/62
3,585,283  6/1971  Graser, Jr. ............................. 358/62

Primary Examiner—James J. Groody
Assistant Examiner—Randall S. Svihla
Attorney, Agent, or Firm—Eugene M. Whitacre; Vincent J. Coughlin, Jr.

[57] ABSTRACT

Improved signal modulating circuits for a light valve projector are disclosed which are capable of increasing the magenta efficiency of the projector. The projector has an input bar plate having slots, a deformable light modulating medium and an output bar plate having slots. The control circuits generate a first control signal for red and a second control signal for blue. The light modulating medium is modulated in accordance with the red and blue control signals. The control circuits enhance the magenta modulation of the light modulating medium by generating a third control signal for magenta.

A first circuit provides a magenta control signal whenever there is a magenta component which is the result of simultaneous inputs from the red and blue signals. A separate signal level for magenta is derived from the red and blue signals and a separate magenta carrier frequency is used which will cause magenta light to pass through slots in the output bar plate. In a second circuit, a second harmonic blue carrier signal is added to the blue carrier signal. A beat frequency is formed between the second harmonic and the carrier frequency used for red. By this technique the magenta intensity is increased because the beat frequency provides modulation of the light modulating medium at a frequency which permits first order magenta to pass through the output bar plate. In the third circuit, the magenta carrier is produced by multiplication of the red and blue modulated carriers prior to being added to the horizontal deflection plates of the light valve projector. This circuit gives additional extra beat frequency emphasis in the magenta control signal applied to the light modulating medium.

10 Claims, 9 Drawing Figures

ALL CARRIERS ARE PHASE COHERENT WITH THE HORIZONTAL DEFLECTION WITH THE EXCEPTION OF THE 12MHz CARRIER WHICH IS INVERTED IN PHASE.

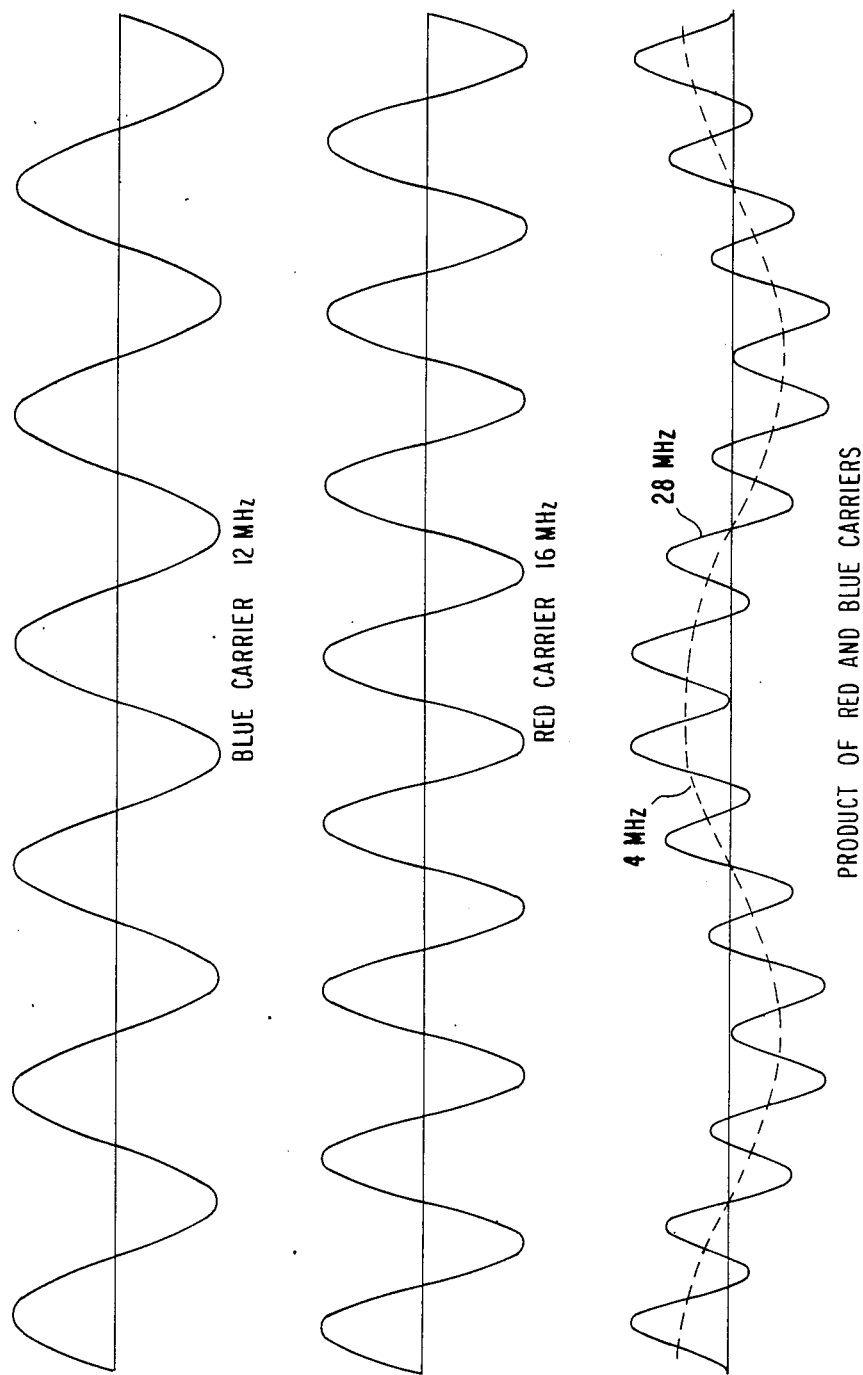

4,679,070

METHOD AND APPARATUS FOR ENHANCING MAGENTA MODULATION OF A LIGHT VALVE PROJECTOR

FIELD OF THE INVENTION

The present invention generally relates to signal modulating circuitry for light valve projectors which enhance the magenta light components of the spectrum which is projected upon a screen. More particularly, this invention relates to systems in which the light modulating medium is a fluid overlying a disk and information is written by an electron beam which scans out a raster on the fluid and forms diffraction gratings which diffract light rays away from the blocking bars of a schlieren dark field system and thus transmit the superimposed information necessary for color projection. In such systems, an array of output bars are used to block undiffracted light or to pass light which has been diffracted by the diffraction gratings. The diffraction gratings are modulated at carrier frequencies which correspond to certain colors and are amplitude modulated in accordance with color control signals.

DESCRIPTION OF THE PRIOR ART

The general principles and mechanisms of light valve projectors are taught, for example, in the patent to Good et al, U.S. Pat. No. 3,437,746. Such systems have been in commercial use for many years and are capable of providing good performance. However, in the prior art light valve projectors, the magenta performance has not been as efficient as is desired. In prior art systems, the usable magenta light efficiency is only in the range of 35 to 40% of the available magenta light which can be obtained from the red and blue signals. Still further the magenta input component colorimetry is not fully additive; i.e., the sum of the red and blue primary intensities when taken separately does not add up to the magenta intensity when the primaries are simultaneously called for by the video signal.

SUMMARY OF THE INVENTION

It is therefore an object of the invention to improve the magenta efficiency of light valve projectors by providing circuitry which will enhance the efficiency by increasing the level of the magenta signal which is used to modulate the control layer of the projector.

In a first embodiment of the invention, the magenta efficiency is enhanced by common magenta signal processing. This circuitry provides a magenta signal whenever there is a magenta component which is the result of simultaneous inputs from the red and blue signals. A separate signal level for magenta is derived from the red and blue signals and a separate magenta carrier frequency is used which will cause magenta light to pass through slots in the output bar array.

In a second embodiment of the invention a second harmonic blue carrier signal is added to the blue carrier signal. A beat frequency is formed between the second harmonic and the carrier frequency used for red. By this technique the magenta intensity is increased because the beat frequency provides modulation of the modulating medium at a frequency which permits first order magenta to pass through the output bar plate.

In a third embodiment of the invention the magenta carrier is produced by multiplication of the red and blue signal modulated carriers prior to being added to the horizontal deflection plates of the light valve projector. This embodiment gives additional extra beat frequency emphasis in the magenta signal applied to the projector modulating medium.

BRIEF DESCRIPTION OF THE DRAWINGS

The foregoing and other objects, aspects and advantages of the invention will be better understood from the following detailed description of preferred embodiments of the invention with reference to the drawings, in which:

FIG. 7 is a waveform diagram showing the multiplication of 24 Mhz second harmonic of a 12 Mhz blue carrier and a 16 Mhz red carrier.

DETAILED DESCRIPTION OF THE PREFERRED EMBODIMENTS OF THE INVENTION

Figure 1:
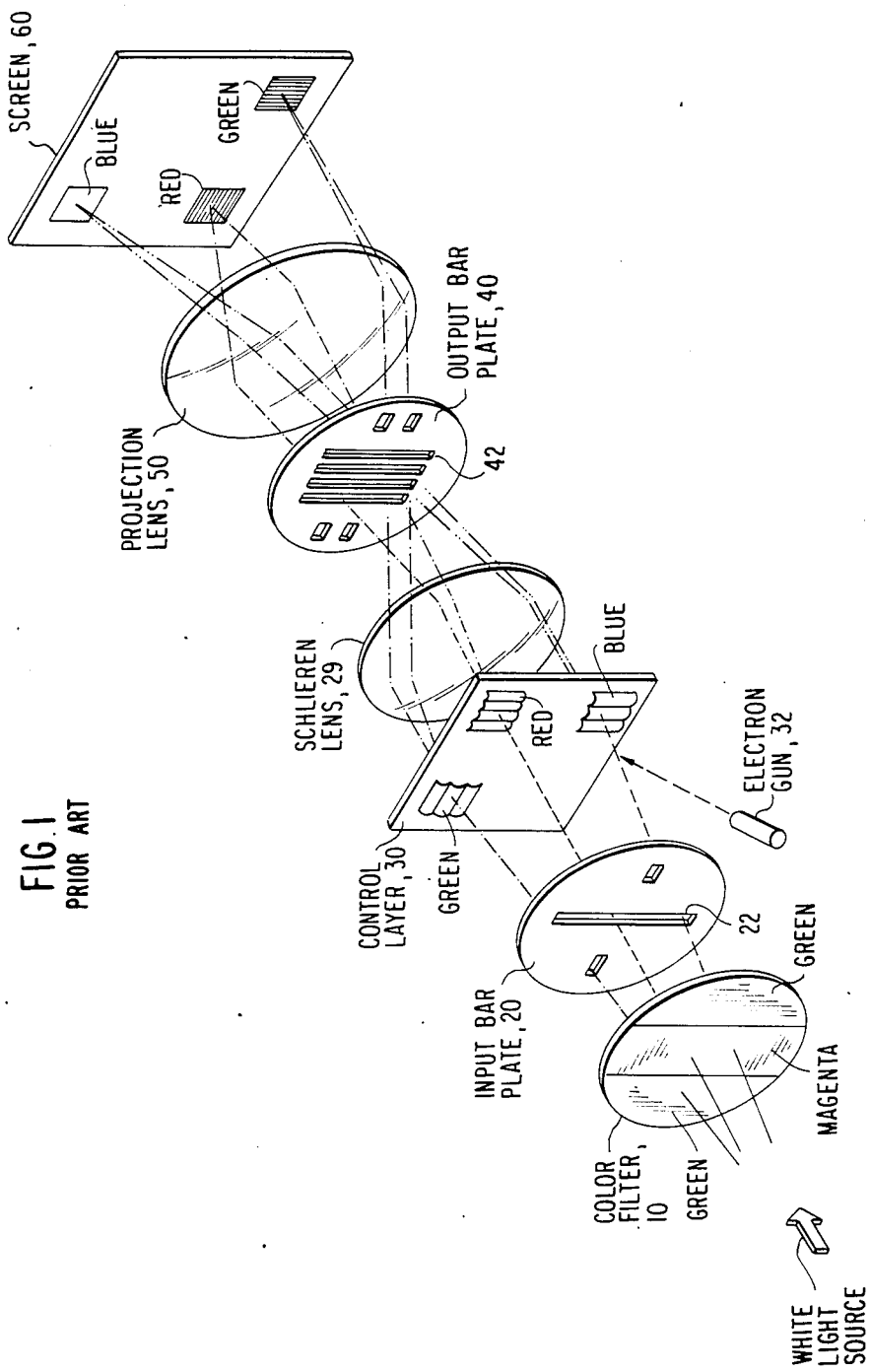
FIG. 1 is a simplified diagram of the light valve projection system illustrating the color selection action and basic gratings of a light valve projector.

Referring now to FIG. 1 of the drawings, there is shown a typical light valve projector which may incorporate the invention. The projector has a color filter 10 which provides magenta light to the input bar plate 20 which is shown here as a vertical slot 22 for passing magenta light. The magenta light then passes through the control layer 30 which is scanned by an electron beam from electron gun 32 which has deflection electrodes (not shown). The electron beam from electron gun 32 modulates the surface of the control layer at spatial frequencies which correspond to the diffraction gratings which diffract the red and blue light through the slots 42 in the output bar plate 40. The red and blue light which passes through the output bar plate is then projected by lens 50 to the viewing screen 60.

Figure 5A:
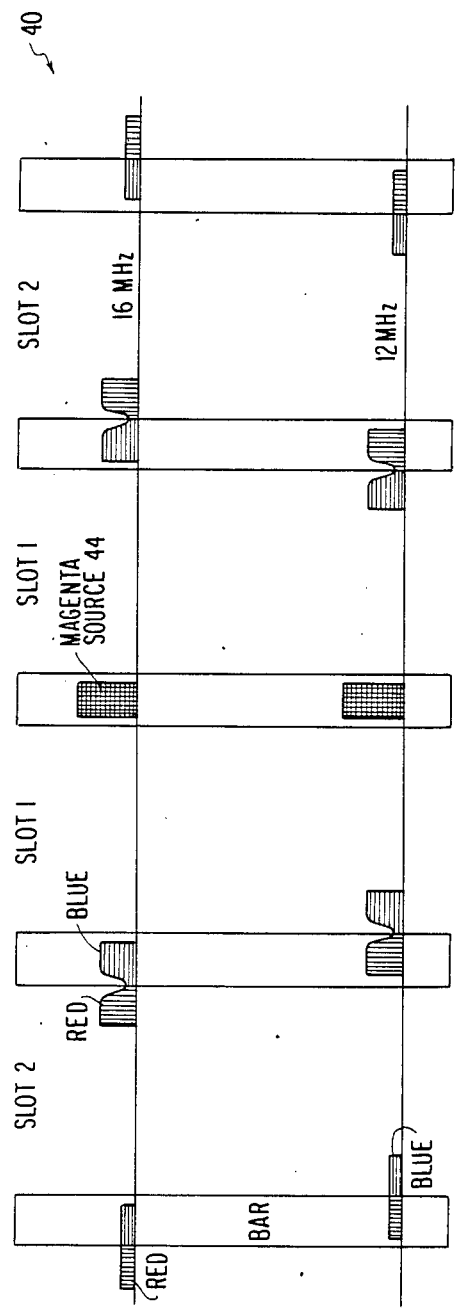
FIGS. 5a and 5b are plan views showing an enlarged representation of the output bar plate and illustrating the passage of red and blue light which has been modulated by the control layer at various frequencies.
Figure 5B:
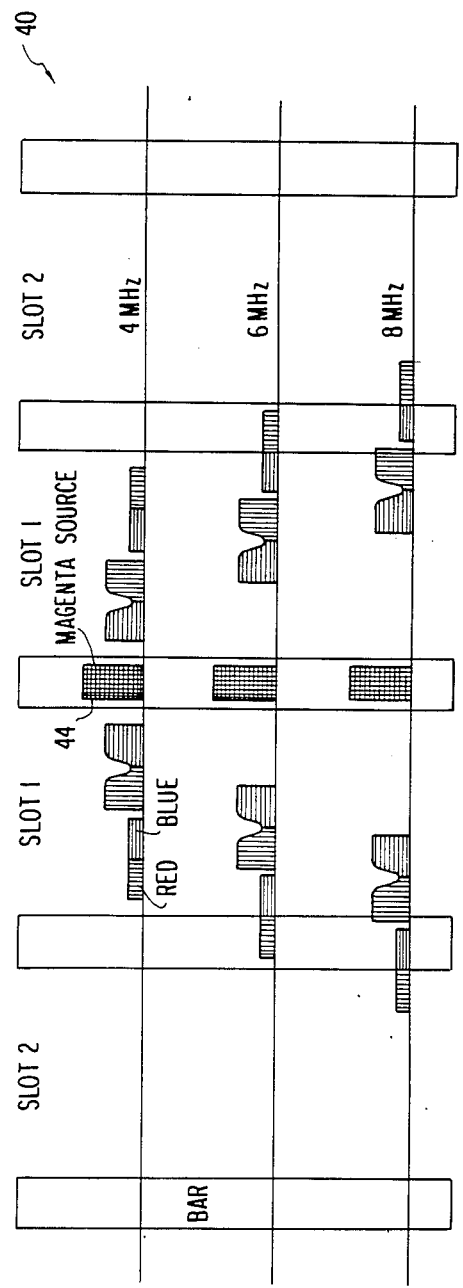

The output bar plate 40 is shown in greater detail in FIGS. 5a and 5b. The magenta light at the bar plate contains both red and blue light in a typical light valve projector and is shown as the magenta source 44 in FIGS. 5a and 5b. For the case of a 525 line, two-to-one interlace, sixty fields per second, television signal and depending upon modulation of the control layer, red is transmitted through the slots 2 by diffraction produced by a 16 MHz grating written by electron beam 32. Similarly, blue is transmitted through slots 1 by diffraction produced by a 12 MHz grating written on the control layer 30. For other scanning rates, the carrier frequency will be different to produce proper spatial gratings on the control layer.

As illustrated in FIG. 5a, red light is separated from the diffracted magenta light by blocking the blue spectra, and, conversely, blue light is separated from diffracted magenta light by blocking the red spectra. Therefore, when both red and blue light are simultaneously modulated, some mutual blocking occurs and magenta efficiency is limited.

Figure 8:
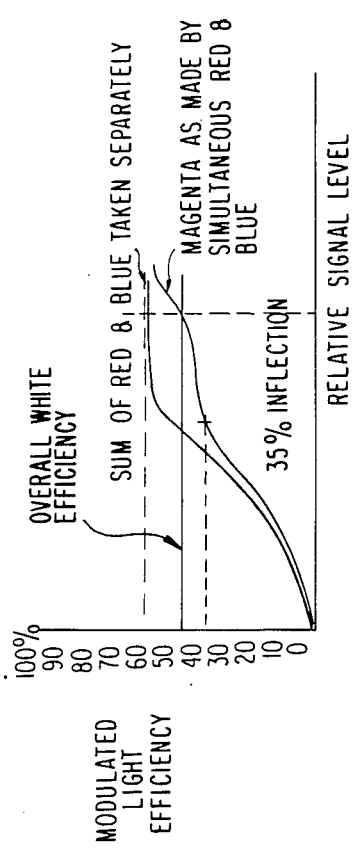
FIG. 8 is a graph showing the relative light output levels which are obtainable with a typical light valve projector.

In FIG. 8, there is illustrated the typical magenta transfer curves of a color light valve projector. These curves show that when red and blue primary lights are separately produced by the projector that each achieves approximately 60% of the available red or blue light. However, when these primary colors are simultaneously called for as they must be to make magenta hue light, the characteristic magenta transfer curve has an inflection which limits the useful efficiency to approximately 35 to 40% of the available magenta light. This is the reason a typical light valve projector is limited by its magenta transfer characteristics to an overall white efficiency of less than 50%.

The typical light valve projector low magenta efficiency is therefore a function of how the red and blue light is separated from the magenta input light. The combination of input slots, the control layer, and output bars and slots are such that if grooves of a particular pitch for red are deforming the control layer surface, the diffraction spectra will be positioned at the output bars such that only red light passes through open slots and blue light falls upon opaque bars. Similarly, another groove pitch for blue can deform the control layer which produces diffraction spectra which passes blue light through the output slots and blocks red light on the opaque bars. This can be seen by reference to FIG. 5a which shows the red transmission at 16 MHz and the blue transmission at 12 MHz.

In a typical light valve projector which transmits red at 16 MHz and blue at 12 MHz, when magenta light is desired, both red and blue modulation is applied simultaneously to transfer red and blue light. Alternatively, it can be obtained with a single groove pattern on the control layer corresponding to 4 MHz, 6 MHz or 8 MHz. Reference to FIG. 5b shows how magenta light consisting of both red and blue light may be diffracted through the control output bars at these different frequencies. The undiffracted light ray object shown in FIG. 5b is a simple magenta optical image 44 which is shown behind the center bar. The most efficient transmission of the magenta occurs at the 4 MHz carrier frequency where first and second order magenta light is transmitted through the slot 1 to the immediate right and left of the center bar. The next most efficient transmission occurs at the 6 MHz carrier frequency where the entire first order magenta is transferred and the blue portion of the second order is transferred. At the 8 MHz level, only the first order red and blue signals are transferred through the first slot and the second order red is transferred through the second slot.

DESCRIPTION OF THE FIRST PREFERRED EMBODIMENT OF THE INVENTION

Figure 2:
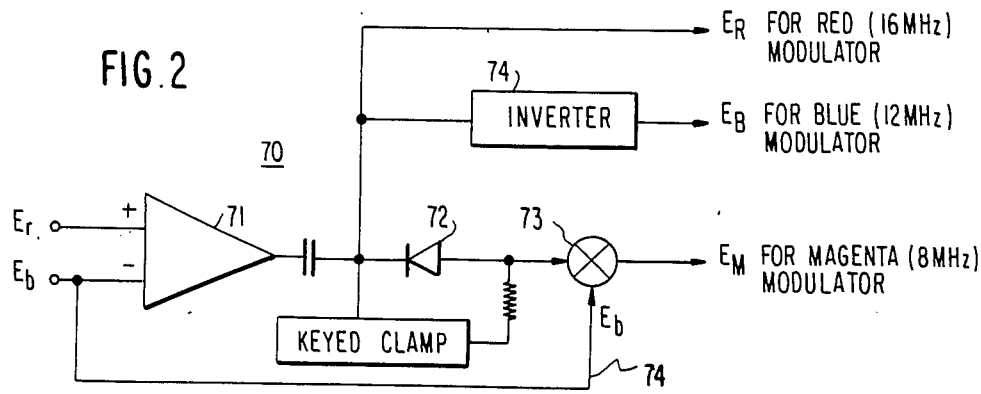
FIG. 2 is a schematic digram of a control circuit which provides for common magenta signal processing of the red and blue control signals.

The embodiment of the control circuit of this invention which is shown in FIG. 2 provides for common magenta signal processing which introduces a third control signal for the magenta light which is a function of the primary red and blue control signal levels. The third magenta control signal is used to modulate a third carrier frequency which is to be used for magenta. With the introduction of this third carrier for magenta to the normal red and blue carriers, the normal two-primary red and blue system changes to that of a three primary red, blue and magenta colorimetry system.

The color mixture analysis for this redundant system is as follows:

I. Assume that the input signals Er and Eb are normalized video signals which are equal when a white or magenta picture is desired. Colorimetrically the magenta picture brightness and hue can be expressed as a combination of:

$$\vec{Y}_r = \vec{s}Er = \text{desired red light}$$

$$\vec{Y}_b = \vec{u}Eb = \text{desired blue light}$$

where Er and Eb are solar quantities and s and u are vectors for normalized red and blue light respectively.

II. With the introduction of a three-primary magenta display which is to be used in the invention, the equations become:

$$\vec{Y}_R = \vec{s}E_R$$

$$\vec{Y}_B = \vec{u}E_B$$

$$\vec{Y}_M = (\vec{s}+\vec{u})E_M = \vec{s}E_M + \vec{u}E_M$$

where $E_R$, $E_B$ and $E_M$ are channel signal voltages controlling the three primary lights.

III. When all three primaries are present, a color and intensity match will occur if:

$$\vec{Y}_r = \vec{s}Er = \vec{s}(E_R + E_M)$$

$$\vec{Y}_b = \vec{u}EB = \vec{u}(E_B + E_M)$$

IV. Therefore, for a color match, the channel voltages of the display are related to the input signals as follows:

$$E_R = (Er - E_M)$$

$$E_B = (Eb - E_M)$$

or $$Er = E_R + E_M$$

and $$Eb = E_B + E_M$$

This relationship establishes two equations which define the red and blue signal levels. These two equations however have three variables which are to be determined by the circuitry. These variables are:

$E_R$, $E_B$, and $E_M$

The conditions for a color match are therefore redundant. That is, for each value of the magenta channel signal, $E_M$, there are corresponding values of red and blue channel signals, $E_R$ and $E_B$ which will satisfy the two color-match identities.

Since the three signals, $E_R$, $E_B$, and $E_M$ are to be used to modulate respective red, blue, and magenta carriers, it is expedient to remove the signal redundancy in a way which gives best light efficiency, and least interaction between carriers. This is done by always making the contribution from the magenta carrier as high as possible without calling for negative light from either the red or blue channel.

In this preferred embodiment, the value of $E_M$ has been chosen so that it is always equal to the smaller of the two input signal voltages Er or Eb. In this manner, either channel voltage, $E_R$ or $E_B$, or both will be zero. Still further, there can never be more than two carriers present at once in the spectrum which is added to the horizontal deflection plates. Therefore the signal processing requires the following relationship for input color signal levels Er and Eb:

$E_M$ = Eb when Er > Eb $E_M$ = Er when Er < Eb $E_M$ = Eb = Er when Er = Eb

FIG. 2 is a block diagram of the processing circuit 70 which accomplishes the desired matrix functions described above. The color difference signal, (Er−Eb) is formed in the differential amplifier 71. If (Er>Eb), the signal is positive and it is blocked by the output clipper 72. Therefore only Eb will be passed to the magenta modulator. If (Er<Eb), the color difference signal at the output of amplifier 71 is negative and it is passed through the clipper to the summation means 73. The summation of the signals Eb on line 74 and the signal (Er−Eb) from the differential amplifier 71 leaves Er as the one remaining signal which is fed to the magenta modulator.

If Er>Eb, the color difference signal fed to the red modulator from the output of amplifier 71 is positive. In this condition, a "blacker-than-black" negative signal is fed to the blue modulator. The negative signal fed to the blue modulator is produced by inverter 74. If a black clipper is present in the blue modulator, this channel will produce no carrier, and only the desired red carrier will be present.

If Er<Eb, the color difference signal from amplifier 71 is negative and when fed to the red modulator is "blacker-than-black" and no red carrier is produced. Also, the signal fed to the blue modulator is positive producing the blue output needed to add to the magenta.

When Er=Eb, only one carrier signal is present $E_M$=Er=Eb, and $E_R$=0=$E_B$. This condition occurs when there is a black and white or magenta-only picture. Therefore, in the case of black-and-white or magenta pictures, only the magenta carrier writes grooves on the control layer 30. This gives a very high magenta efficiency of 65% to 70%. For any other mixture hue, the efficient magenta carrier is used to control the magenta portion of the desired light, and either red or blue, but not both, are added to tint the magenta towards one of the other primary colors.

DESCRIPTION OF THE SECOND PREFERRED EMBODIMENT OF THE INVENTION

Figure 3:
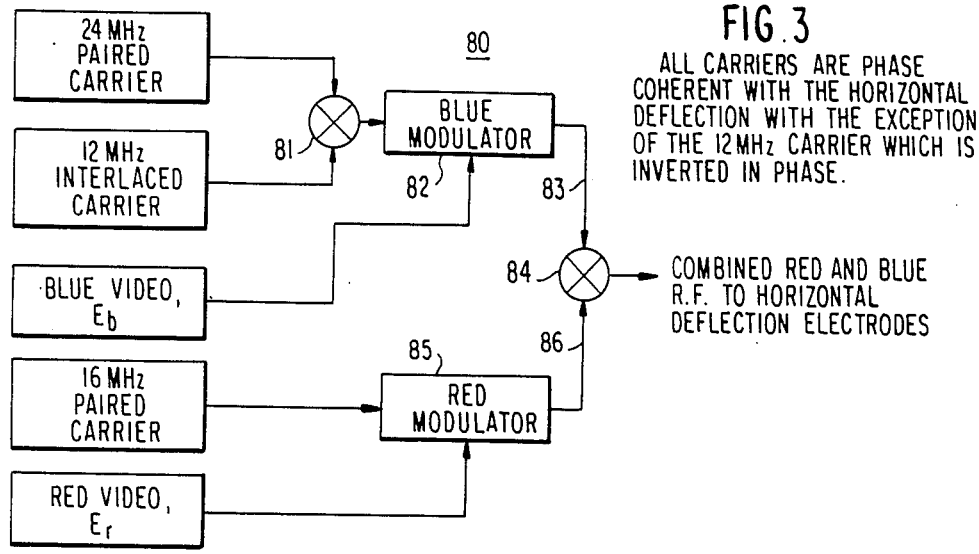
FIG. 3 is a block diagram of a control circuit which provides for the insertion of a second harmonic blue carrier signal which, when added to the red carrier signal, provides a beat frequency which provides enhanced magenta at the modulated control layer.

In the second embodiment of the invention, shown in FIG. 3, the extra magenta efficiency is produced on the control layer 30 through the use of a separate 8 MHz carrier. In this embodiment the 8 MHz carrier is the beat frequency produced by a 12 MHz interlaced carrier and a 24 MHz paired carrier that are used for the blue modulation of the control layer 30. The 8 MHz signal is therefore the beat frequency of the second harmonic blue carrier and the 16 MHz red carrier. The passage of the 8 MHz signal through the diffraction gratings is the same as described with respect to the first embodiment and is illustrated in FIG. 5B.

In this embodiment, the combination of the 24 MHz and the 12 MHz carriers is at the control layer, and it is here that the 8 MHz grooves are formed. This is because the adder 84 passes all three signals (12, 16, and 24 MHz). The 8 MHz as explained with respect to FIG. 5B provides the best choice for the magenta carrier frequency.

The processing circuit 80 shown in FIG. 3 provides the signal to the deflection plates by first adding the blue carrier 12 MHz and 24 MHz second harmonic signals at adder 81. The blue signals are then modulated with the blue video signal level Eb by modulator 82. The output of modulator 82 on line 83 is fed to adder 84. The red carrier at 16 MHz is applied to red modulator 85 and is then modulated by the red video signal Er. The output of modulator 85 is on line 86 and is also added to the signal on line 83 to provide the combined output to the horizontal deflection electrodes of the electron gun system 32.

In the embodiment of FIG. 3, all carriers are phase coherent with the horizontal deflection, on a field to field basis, with the exception of the 12 MHz carrier which is inverted in phase. The carriers are derived from a common keyed oscillator which operates at six times the frequency of the red carrier and eight times the frequency of the blue carrier or 96 MHz. Other combinations of master oscillator and frequency divisions or multiplications can be used to achieve the desired carrier signals.

The modulated 24 Mhz carrier does not write much primary blue light because of its close groove to groove spacing at the control layer. For this reason, the primary effect of the 24 Mhz signal is the 8 Mhz best signal which provides the magenta light as explained with respect to FIG. 5B.

DESCRIPTION OF THE THIRD PREFERRED EMBODIMENT OF THE INVENTION

Figure 4:
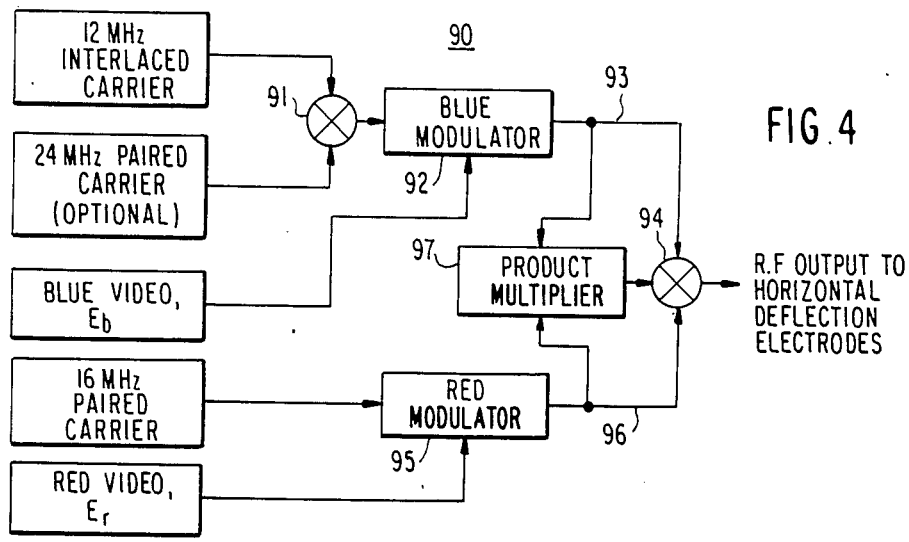
FIG. 4 is a block diagram of a control circuit which provides for multiplication of the combined second harmonic blue and blue carrier signals which have been modulated by the control signal with the red carrier signal which, in turn, has been modulated by the control signal.

FIG. 4 shows the third embodiment in which the processing circuit 90 is structurally the same as the second embodiment but with the addition of a product multiplier 97 which provides an additional input to the adder 94 which provides an output to the deflection electrodes. More specifically, the circuit shown in FIG. 4 includes an adder 91, a blue modulator 92, and a red modulator 95, corresponding to the the adder 81, blue modulator 82, and red modulator 85 shown in FIG. 3. The output on line 93 of the blue modulator and the output on line 96 of the red modulator are fed to the adder 94, as in the circuit shown in FIG. 3.

The action of the multiplier is illustrated by the trigonometric identity:

$$\sin (A) \times \sin (B) = \tfrac{1}{2}[\cos (A-B) - \cos (A+B)]$$

This shows that the product results in a sum of the frequencies and the difference of the frequencies which are multiplied. When this product is added to the 12 MHz and 16 MHz carriers, the difference frequency, 4

MHz will create grooves on the control layer at that frequency. As has been shown in FIG. 5B, the 4 MHz carrier modulation produces both first and second order magenta light to the output slot 1. The sum frequency 28 MHz will however produce groove spacing which is too fine to produce deep enough grooves for significant diffraction and is therefore not considered as a component of the output.

By multiplication of the 16 MHz signal and the 24 MHz second harmonic blue signal, a difference frequency of 8 MHz is produced. This 8 MHz signal, like the 4 MHz signal, will modulate the control layer and produce grooves which will pass magenta light as was explained with respect to FIG. 5B in the description of the first embodiment above.

FIG. 6 shows the product of the 16 MHz red carrier and the 12 MHz blue carrier. The lower curve shows the fundamental 4 MHz signal and the 28 MHz superimposed upon it.

Figure 7:
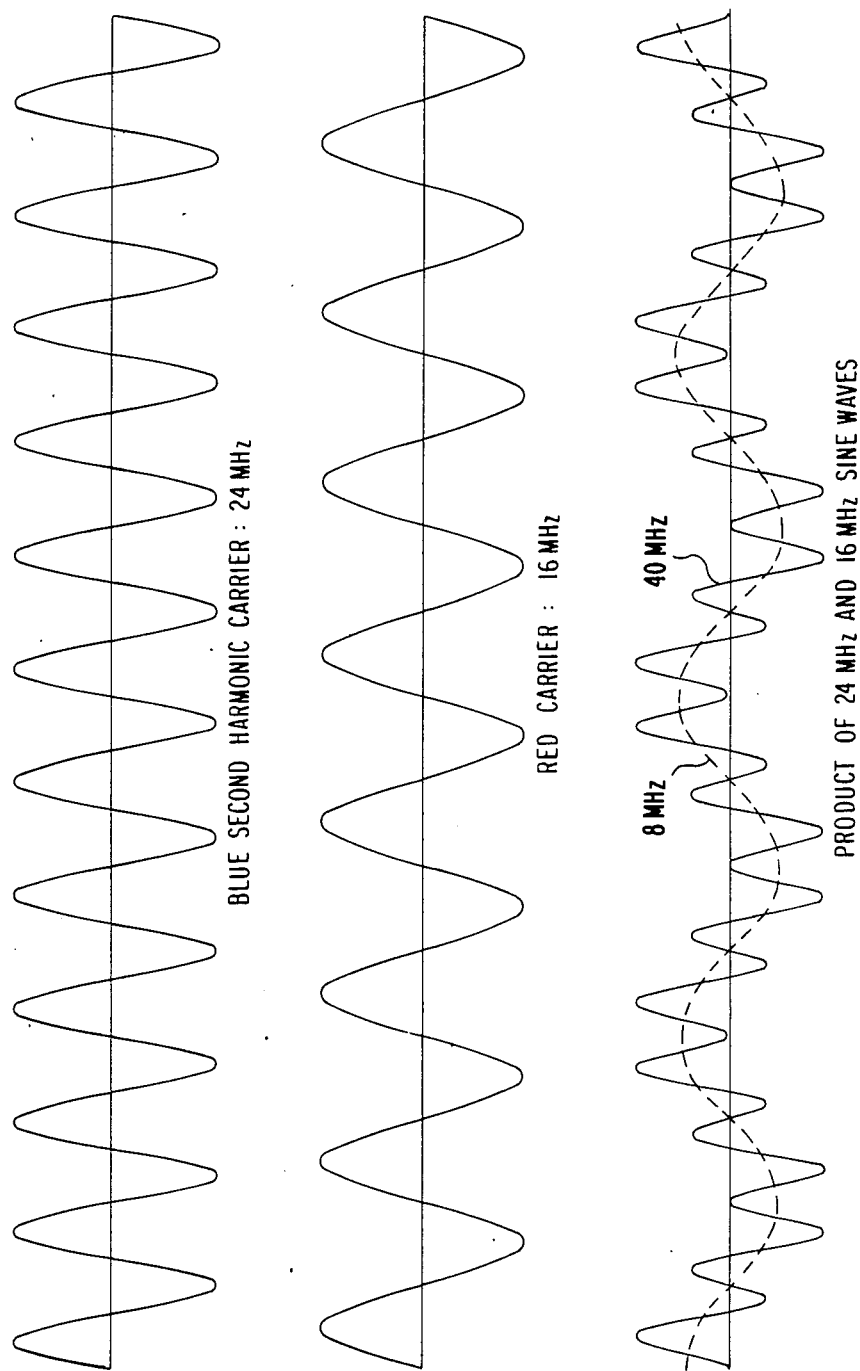
FIG. 7 is a waveform diagram showing the multiplication of a 12 MHz blue carrier and a 16 Mhz red carrier.

FIG. 7 shows the product of the 24 MHz signal and the 16 MHz carrier signal. The lower curve shows the fundamental 8 MHz signal (the difference signal) and the 40 MHz signal superimposed upon it.

In the embodiment of FIG. 4, the 4 MHz and the 8 MHz components are present in the complex spectrum because of their creation in the multiplier prior to passing through the adder 94. The 8 MHz signal is also produced at the control layer as explained with respect to the second embodiment. The 8 MHz signal is still produced as the 16 and 24 MHz signals combine on the control layer.

While the invention has been described in terms of three preferred embodiments, changes and modifications can be made without departing from the spirit and scope of the invention.

Having thus described my invention, what I desire to secure by Letters Patent is set forth in the following claims.

1. An improved modulator control circuit for enhancing magenta modulation of a light valve projector having an input bar plate having slots, an electron gun including deflection means, a deformable light modulating medium and an output bar plate having slots comprising in combination:
   means for generating a first control signal for red and a second control signal for blue;
   means for determining the larger of said first and second control signals or if said first and second control signals are equal;
   means for generating a third control signal for magenta equal to the smaller of said first and second control signals or to said first and second control signals if said first and second control signals are equal; and
   means for modulating said light modulating medium with an electron beam produced by said electron gun in accordance with said first, second and third control signals.

2. The modulator control circuit of claim 1 further comprising:
   means for forcing the smaller of said first and second control signals to zero if said first and second control signals are not equal; and
   means for reducing the amplitude of the larger of said first and second control signals by an amount equal to the amplitude of the smaller of said first and second control signals.

3. The modulator control circuit of claim 1 wherein said means for generating said third control signal comprises:
   differencing means responsive to first red and second blue input video signals for producing at an output a difference signal;
   summing means having first and second inputs, said first input being connected to receive said second input video signal, said summing means producing an output which is said third control signal; and
   blocking means connected between the output of said differencing means and the second input of said summing means for passing said difference signal to said summing means only when said first input video signal is smaller than said second input video signal.

4. The modulator control circuit of claim 3 wherein the output of said differencing means is said first control signal and further comprising inverting means connected to the output of said differencing means, the output of said inverting means being said second control signal.

5. An improved modulator control circuit for enhancing magenta modulation of a light valve projector having an input bar plate having slots, an electron gun including deflection means, a deformable light modulating medium and an output bar plate having slots comprising in combination:
   means for generating a first control signal for red and a second control signal for blue;
   first modulator means for modulating a first carrier having a first frequency with said first control signal to produce a first modulated carrier at an output;
   second modulator means for modulating a second carrier with said second control signal to produce a second modulated carrier at an output;
   first summing means for summing a carrier having a second frequency and a carrier having a frequency which is the second harmonic of said second frequency to produce said second carrier; and
   second summing means for summing the outputs of said first and second modulator means whereby a beat frequency which is the difference between said first frequency and said second harmonic of said second frequency is produced in said light modulating medium.

6. The modulator control circuit of claim 5 further comprising multiplier means connected to the outputs of said first and second modulator means for producing an output signal having a frequency which is the difference between said first and second frequencies, said output signal being supplied as an additional input to said second summing means.

7. A method of enhancing magenta modulation of a light valve projector having an input bar plate having slots, an electron gun including deflection means, a deformable light modulating medium and an output bar plate having slots comprising the steps of:
   generating first, second and third carrier signals having a frequency relationship of four-to-three-to-six, respectively;
   modulating said first carrier signal with a red video signal to produce a first modulated signal;
   summing said second and third carrier signals to produce a first summed signal;
   modulating said first summed signal with a blue video signal to produce a second modulated signal; and summing said first and second modulated signals to produce a second summed signal for controlling the deflection of an electron beam impinging on said light modulating medium whereby a beat frequency which is the difference between the frequencies of said first and third carrier signals is produced in said light modulating medium.

8. The method of enhancing magenta modulation of a light valve projector of claim 7 further comprising the step of multiplying together said first and second modulated signals to produce a signal having a frequency which is the difference between the frequencies of said first and second carrier signals, said multiplied signal being summed with said first and second modulated signals to produce said second summed signal.

9. A method of enhancing magenta modulation of light valve projector having an input bar plate having slots, an electron gun including deflection means, a deformable light modulating medium and an output bar plate having slots comprising the steps of:

subtracting a blue video signal from a red video signal to produce a difference signal;

summing said difference signal and said blue video signal when said blue video signal is greater than red video signal to produce a magenta modulation signal; otherwise supplying said blue video signal as said magenta modulation signal when said blue video signal is less than or equal to said red video signal.

10. The method of enhancing modulation of a light valve projector of claim 9 further comprising the steps of:

supplying said difference signal as a red modulation signal; and supplying the inverse of said difference signal as a blue modulation signal.

* * * * *